(12) United States Patent
Horvat et al.

(10) Patent No.: US 8,179,915 B2
(45) Date of Patent: May 15, 2012

(54) SYSTEM AND METHOD FOR TRANSMITTING AND RETRANSMITTING DATA

(75) Inventors: Michael Horvat, Munich (DE); Umashankar Thyagarajan, Bangalore (IN)

(73) Assignee: Lantiq Deutschland GmbH, Neubiberg (DE)

( * ) Notice: Subject to any disclaimer, the term of this patent is extended or adjusted under 35 U.S.C. 154(b) by 1356 days.

(21) Appl. No.: 11/770,001

(22) Filed: Jun. 28, 2007

(65) Prior Publication Data

US 2009/0003376 A1 Jan. 1, 2009

(51) Int. Cl.
*H04J 3/16* (2006.01)
(52) U.S. Cl. ........................ 370/465
(58) Field of Classification Search .................. None
See application file for complete search history.

(56) References Cited

U.S. PATENT DOCUMENTS

| | | | |
|---|---|---|---|
| 6,498,808 B1 | 12/2002 | Tzannes | |
| 6,956,872 B1 | 10/2005 | Djokovic et al. | |
| 7,580,427 B2 * | 8/2009 | Yun et al. ........... | 370/477 |
| 2005/0276341 A1 | 12/2005 | Umashankar | |
| 2006/0023690 A1 | 2/2006 | Umashankar et al. | |
| 2006/0056526 A1 | 3/2006 | Jain | |
| 2006/0088054 A1 | 4/2006 | Tzannes et al. | |
| 2006/0176942 A1 | 8/2006 | Oksman et al. | |
| 2009/0138775 A1 * | 5/2009 | Christiaens et al. ........ | 714/748 |
| 2009/0310586 A1 * | 12/2009 | Shatti ........................... | 370/338 |

FOREIGN PATENT DOCUMENTS

WO 02/058310 7/2002

OTHER PUBLICATIONS

Broadcom, BCM6410/6420 Product Brief, Jun. 2004.*

Internetworking Technology Overview article entitled "Digital Subscriber Line," Chapter 15, 12 pgs; Jun. 1999.
M.J. Langlois, "ADSL Tutorial," extracted from the Introduction and Chapter 1 of A G.hs Handshaking Protocol Analyzer for ADSL; 13 pgs.; May 2002.
P. Sevalia, Delivering High Quality Video Service on DSL Networks, 7 pgs.; 2006.
M. Peeters, "ADSL:G.vdsl: Control Parameters and Performance of a Retransmission Scheme," 8 pgs.; Oct. 2006.
M. Tzannes, "VDSL2: Proposal for a VDSL2 Data Retransmission Protocol," 5 pgs; Oct. 2006.
U. Thyagarajan et al;., "G.ADSL2, G.ADSL2+, GVDSL2: Requirements for Retransmission Technique," 5 pgs; Oct. 2006.
B. Heise, "VDSL2: Frame Repetition to Combat REIN," 4 pgs.; Jun. 2006.
K.S. Jacobson et al., "VDSL2: REIN, REIN, Go Away—The Return of Frame Blanking," 6 pgs.; Jun. 2006.
M. Peeters, "G.gen: VDSL: ADSL Retransmission Mode in DSL," 6 pgs.; Sep. 2006.
M. Horvat, "VDSL2, ADSL2, G.gen: Concatenation of Interleaved Reed-Solomon and Retransmission," 5 pgs.; Jan. 2007.
M. Horvat, "VDSL2, ADSL2, G.gen: Refined Retransmission MOdel at $\alpha$ i/f with Interleaved RS FEC," 3 pgs.; Apr. 2007.
M. Horvat, "VDSL2, ADSL2, G.gen: Simulation Results on Impulse-Noise Tests," 7 pgs.; Apr. 2007.
B. Heise et al., "VDSL2 Proposal for a Physical-Layer Retransmission Method," 4 pgs.; Jan. 2007.

* cited by examiner

*Primary Examiner* — Kevin C Harper
(74) *Attorney, Agent, or Firm* — Eschweiler & Associates, LLC

(57) ABSTRACT

A method of transmitting data includes storing a first set of transmission data and a first set of retransmission data. A first ratio of transmission data to retransmission data is determined. A plurality of transmission data units is generated with each data unit including a portion of transmission data from the first set of transmission data and a portion of retransmission data from the first set of retransmission data in accordance with the first ratio. The plurality of transmission data units is transmitted.

24 Claims, 4 Drawing Sheets

SYSTEM AND METHOD FOR TRANSMITTING AND RETRANSMITTING DATA

BACKGROUND

Data transmission typically involves a data transmitter having a transmission circuit configured to transmit a series of data units. A corresponding data receiver typically includes a receiver circuit configured to receive the transmitted series of data units. Problems exist as to how to handle corrupt data units not received correctly by the data receiver.

For these and other reasons, there is a need for the present invention.

SUMMARY

One embodiment provides a method of transmitting data, including storing a first set of transmission data and a first set of retransmission data. A first ratio of transmission data to retransmission data is determined. A plurality of transmission data units is generated with each data unit including a portion of transmission data from the first set of transmission data and a portion of retransmission data from the first set of retransmission data in accordance with the first ratio. The plurality of transmission data units is transmitted.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
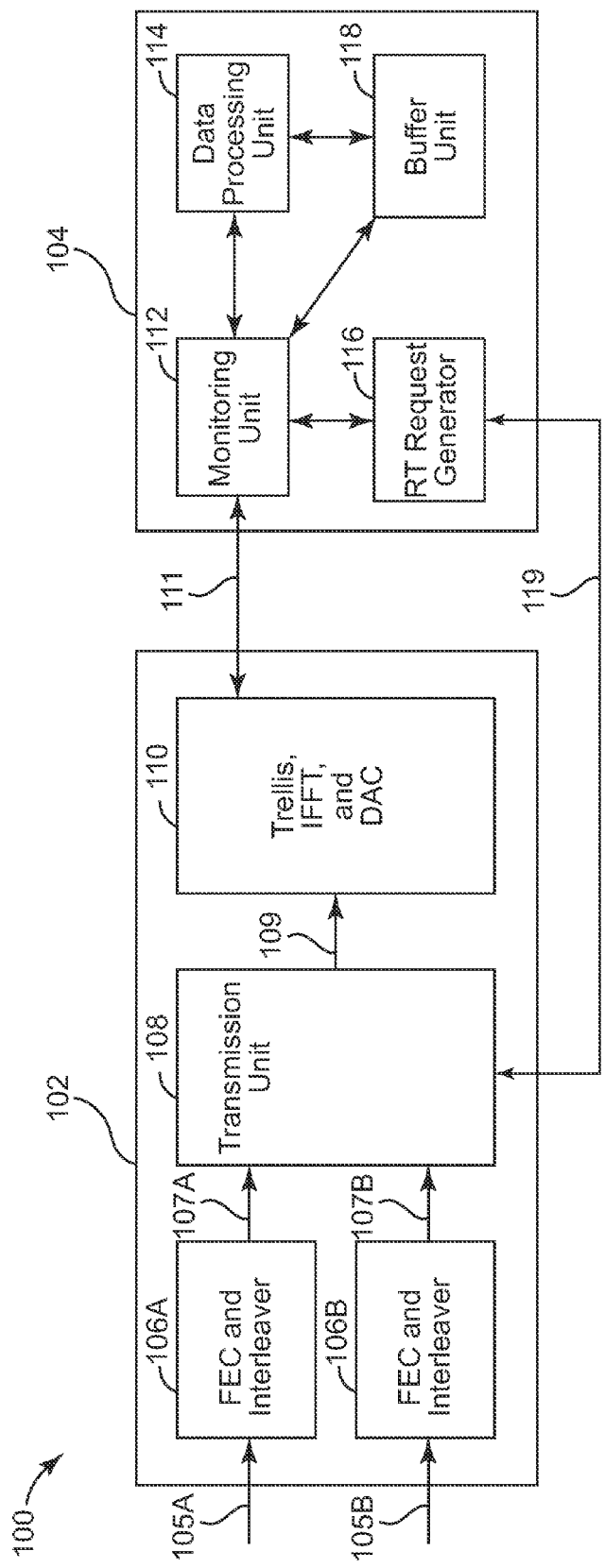
FIG. 1 is a block diagram illustrating a communication system according to one embodiment.

FIG. 1 is a block diagram illustrating a communication system 100 according to one embodiment. In the illustrated embodiment, communication system 100 includes a transmitter 102 and a receiver 104. In another embodiment, blocks 102 and 104 are both transceivers. As shown in FIG. 1, transmitter 102 includes forward error correction (FEC) and interleaver units 106A and 106B, transmission unit 108, and Trellis encoding, inverse fast Fourier transform (IFFT), and digital-to-analog converter (DAC) unit 110. Receiver 104 includes monitoring unit 112, data processing unit 114, retransmission (RT) request generator 116, and buffer unit 118.

In one embodiment, communication system 100 provides error protection capabilities. Error protection capability, in this respect, generally relates to the capability of a communication device like a transmitter, a receiver, or a transceiver to correct or compensate errors during transmission. Such errors, for example, may occur if a communication path, like a wire or a path used for wireless transmission, is subjected to electromagnetic radiation, for example generated by other electronic devices.

In one embodiment, units 106A and 106B of transmitter 102 use a forward error correction (FEC) technique, such as Reed-Solomon encoding, and also perform interleaving of data. The Reed-Solomon encoding combined with interleaving and retransmission of erroneous or corrupted data provide system 100 with error protection capabilities.

Reed-Solomon encoding is a technique that uses redundancy to be able to recover, in the case of a partial loss or corruption of transmitted data, the complete transmitted data. Increased redundancy gives an increased capability to recover lost or corrupted data, but also lowers the possible data rate since more redundant data has to be transmitted.

Interleaving basically changes the order in which data units (e.g., packets, cells, data frames or the like) are sent. Interleaving essentially spreads the damage from an impulse noise hit across multiple data units, thereby reducing the likelihood that consecutive data bytes within a single data unit will be corrupted. For example, instead of having ten bytes in a single data unit being corrupted, which may be too large of an error to be corrected by FEC, one byte in ten consecutive data units will be corrupted, which should be correctable by FEC. Although interleaving provides improved error correction capabilities, it introduces a delay in the data path. In other embodiments, other forward error correction techniques may be used as an alternative to, or in addition to, Reed-Solomon encoding. In other embodiments, no such technique is used.

Data 105A and 105B to be transmitted from transmitter 102 to receiver 104 is fed to units 106A and 106B, respectively, to perform Reed-Solomon encoding and interleaving. Units 106A and 106B output data 107A and 107B, respectively, to transmission unit 108. In one embodiment, transmission unit 108 includes one or more buffer units for temporary storage of the data 107A and 107B. Transmission unit 108 outputs data units 109 to Trellis, IFFT, and DAC unit 110.

The data 107A output by unit 106A is also referred to herein as latency path one (LP1) data, and the data 107B output by unit 106B is also referred to herein as latency path two (LP2) data. Latency paths are paths through the physical layer with different latency characteristics, which allows the support of varying applications that require different performance and robustness characteristics. ADSL (Asymmetric Digital Subscriber Line) systems support two latency paths for data transmission (i.e., a slower interleaved path and a faster non-interleaved path). ADSL2 systems support up to four latency paths. VDSL (Very High Bit Rate Digital Subscriber Line) and VDSL2 also support multiple latency paths.

Different applications typically have different latency requirements. For example, applications involving data transfer (e.g., Internet browsing) may not be very sensitive to latency delays, while applications involving voice communications are more sensitive to latency delays. Multiple latency paths permit multiple logical channels to share one physical DSL link with different latency and error protection tradeoffs per logical channel. In one embodiment, units 106A and 106B selectively apply or exclude FEC and interleaving to received data 105A and 105B based on the latency requirements. In one embodiment, unit 106A applies a different level or degree of encoding or interleaving than unit 106B. In another embodiment, unit 106A applies encoding and interleaving, while unit 106B applies encoding but no interleaving.

In one embodiment, transmitter 102 uses a multi-carrier modulation technique, such as discrete multi-tone modulation (DMT), for modulating data to be sent onto a plurality of carrier frequencies. With DMT modulation, the bandwidth is divided into separate sub-channels. For example, in ADSL1, the frequency range of 0 to 1104 kHz is divided into 256 separate 4.3125 kHz wide sub-channels; in ADSL2+ the frequency range of 0 to 2208 kHz is divided into 512 separate 4.3125 kHz wide sub-channels; and in VDSL2 the frequency range is divided up into 4096 separate 4.3125 kHz or 8.625 kHZ wide sub-channels in a range of 0 to 3478×8.625 kHz. The sub-channels are also referred to as sub-carriers, carriers, bins, or tones. Each sub-channel is associated with a discrete frequency, or tone, and is essentially a single distinct data channel. Each of the sub-channels can support modulation of various bits, for example 0 to 15 bits. The data bits to be transmitted are modulated onto the sub-channels using a modulation technique like quadrature amplitude (QAM) modulation for each sub-channel. In general, the widths of the channels, the number of channels, and the frequency ranges for upstream and downstream directions vary between the various DSL standards.

DMT modulation is used in, for example, DSL systems. In such systems, data is transmitted in the form of data frames, with each data frame containing a number of bits of the data to be sent. In one embodiment, communication system 100 is a DSL system, and the data units 109 output by transmission unit 108 are data frames. In other embodiments, different types of data units and modulation techniques may be used.

The data frames 109 to be transmitted are forwarded from transmission unit 108 to Trellis, IFFT, and DAC unit 110, which in the illustrated embodiment performs a Trellis encoding in order to modulate the data corresponding to the data frames to be sent onto a plurality of carrier frequencies, an inverse fast Fourier transform to convert the frames to be sent to the time domain, and a digital-to-analog conversion to convert the signal thus generated to an analog signal to be transmitted via a communication link 111. The frames sent in this manner are also referred to as symbols (i.e., in one embodiment, unit 108 maps each frame to a DMT symbol). In one embodiment, transmitter 102 and receiver 104 each store a bit table (or bit allocation table) that contains information regarding how many bits (e.g., 0 to 15) are to be loaded onto each of the sub-channels. The bit table specifies how many bits are allocated to each sub-channel for modulation in one DMT symbol. In one embodiment, unit 110 also adds a frame checksum (FCS) to each frame, with the checksum being calculated in any suitable manner based on the content of the frame.

On the receiver side, a monitoring unit 112 receives the frames via communication link 111 and performs the complementary operations to unit 110 in the reverse order (e.g., an analog-to-digital conversion, a fast Fourier transform, and a Trellis decoding). Using the frame checksum mentioned above, monitoring unit 112 evaluates whether received frames have been received correctly, or have been corrupted, and stores the received frames in a buffer unit 118. In general, a frame (or more generally a data unit) that is not received correctly is referred to as corrupt frame or corrupt data unit.

As long as no transmission error occurs, the frames are then forwarded by monitoring unit 112 to a data processing unit 114, which performs a deinterleaving process that places the received data in the original order that it was in before being interleaved by unit 106A or 106B. Data processing unit 114 also performs Reed-Solomon decoding and performs any further data processing desired.

If a received frame is corrupt (e.g., the frame checksum does not match with the content of the frame), a reconstruction may be possible at the receiver 104. If reconstruction is possible, data processing unit 114 reconstructs any corrupt frames using the corresponding Reed-Solomon decoding and the frames stored in the buffer unit 118.

However, if it is not possible to reconstruct a corrupt frame, monitoring unit 112 instructs retransmission request generator 116 to send a retransmission request over communication link 119 back to transmitter 102 in order to request retransmission of a corrupt frame or frames, i.e., to request that the corrupt frame or frames be sent again. The retransmission request is received by transmission unit 108, which processes such requests and handles the retransmission of data as described in further detail below with reference to FIG. 2.

Note that communication links 111 and 119 may be the same physical communication link or may be different physical communication links. In other embodiments, communication links 111 and 119 are wireless communication links. In one embodiment, retransmission requests use a different frequency range than the normal communications between transmitter 102 and receiver 104.

In an embodiment where transmitter 102 and receiver 104 are both implemented as transceivers, for example to provide DSL data communication in both directions, the retransmission requests may be sent together with the DSL payload data. For example, the retransmission requests can be modulated on predetermined frequency channels reserved for such requests, or a predetermined identifier may be used in a frame to be able to identify the frame as a retransmission request.

As explained above, while in the embodiment of FIG. 1 a Reed-Solomon encoder and an interleaver are present in units 106A and 106B, in other embodiments no Reed-Solomon encoding or interleaving is used in one or both of units 106A and 106B. In such an embodiment, when monitoring unit 112 receives a corrupt frame, it may control retransmission request generator 116 to request retransmission of the corrupt frame without first evaluating whether a recovery of the corrupt frame is possible by Reed-Solomon decoding.

In one embodiment, when a retransmission request is sent by retransmission request generator 116, received frames are stored in buffer unit 118 in receiver 104 until the requested retransmitted frames are received, such that the frames are then forwarded to data processing unit 114 in the correct order.

In order to restore the correct order of data units like the above-mentioned frames, in one embodiment, the transmitted data units are provided with an identifier like a sequence ID (SID), for example a number which increments by one with each frame.

In one embodiment, the retransmission mechanism in unit 108 is implemented "below" an interleaver i.e., downstream of an interleaver in the transmitter 102 and upstream of a deinterleaver in the receiver 104. This is one example of an implementation in the physical layer or layer 1 according to the OSI layer model. However, in other embodiments the retransmission mechanism may be implemented in other layers.

In one embodiment, FEC and interleaver units 106A and 106B are located in a Physical Media Specific-Transmission Convergence (PMS-TC) layer, and receive data 105A and 105B from a Transport Protocol Specific-Transmission Convergence (TPS-TC) layer; and Trellis, IFFT, and DAC unit 110 is located in a Physical Media Dependent (PMD) layer. In one embodiment, transmission unit 108, which provides retransmission capabilities, is also located in the PMD layer, or between the PMS-TC and PMD layers. In another embodiment, the location or position of units 106A and 106B is switched with the location or position of the transmission unit 108. In this embodiment, the transmission unit 108 is located upstream of the FEC and interleaver units 106A and 106B.

Note that FIG. 1 is a block diagram illustrating elements relevant for the understanding of the embodiments, and further elements like line drivers, signal processing elements, filters, equalizers, and the like may or may not be present in actual implementations.

Figure 2:
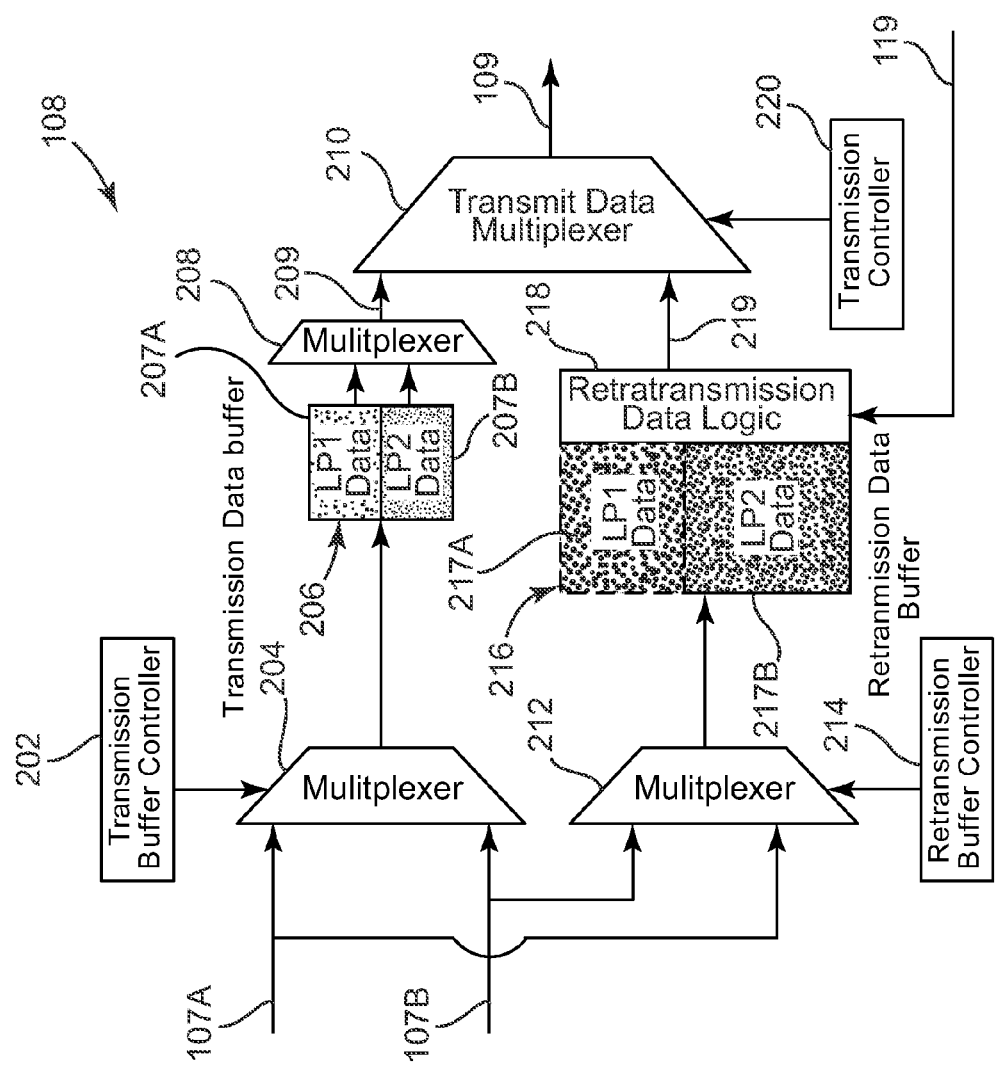
FIG. 2 is a block diagram illustrating a transmission unit for the transmission and retransmission of data according to one embodiment.

FIG. 2 is a block diagram illustrating a transmission unit 108 for the transmission and retransmission of data according to one embodiment. Unit 108 includes transmission buffer controller 202, multiplexer 204, transmission data buffer 206, multiplexer 208, multiplexer 210, multiplexer 212, retransmission buffer controller 214, retransmission data buffer 216, retransmission data logic 218, and transmission controller 220.

Latency path one (LP1) data 107A and latency path two (LP2) data 107B, which are output from units 106A and 106B (FIG. 1), respectively, are provided to multiplexers 204 and 212. Transmission buffer controller 202 controls multiplexer 204 to selectively output the received data 107A and 107B to transmission data buffer 206. As shown in FIG. 2, transmission data buffer 206 includes stored LP1 data 207A and stored LP2 data 207B. Retransmission buffer controller 214 controls multiplexer 212 to selectively output the received data 107A and 107B to retransmission data buffer 216. As shown in FIG. 2, retransmission data buffer 216 includes stored LP1 data 217A and stored LP2 data 217B.

Transmission data buffer 206 temporarily stores the data 207A and 207B before the actual transmission. Retransmission data buffer 216 stores data 217A and 217B even after the data has been transmitted. In one embodiment, retransmission data buffer 216 stores a predetermined amount or number of data frames of LP1 data 217A, and a predetermined amount or number of data frames of LP2 data 217B, after the data have been transmitted (e.g., the last 10 milliseconds of data frames, or the last 20 transmitted data frames, or the last 100 transmitted data frames, etc.). Retransmission buffer controller 214 controls the amount of data to be stored in retransmission data buffer 216 for each of the latency paths in the system 100. In one embodiment, retransmission buffer controller 214 is configured to change or update the amount of data to be stored in retransmission data buffer 216 for each of the latency paths during normal operation of the transmitter 102 in response to changing conditions.

As shown in FIG. 2, transmission data buffer 206 includes equal amounts of LP1 data 207A and LP2 data 207B, while retransmission data buffer 216 includes approximately twice as much LP2 data 217B as LP1 data 217A. In one embodiment, retransmission buffer controller 214 is configured to dynamically change the ratio of LP1 data 217A and LP2 data 217B stored in retransmission data buffer 216, including storing only LP1 data 217A or storing only LP2 data 217B in buffer 216. Buffers 206 and 216 may be implemented as two separate buffers as shown in FIG. 2, or as a single buffer. Buffers 206 and 216 may take the form of one or more memories, such as one or more RAM devices.

Multiplexer 208 selectively outputs LP1 data 207A and LP2 data 207B as transmission data 209 to multiplexer 210. Retransmission data logic 218 selectively outputs LP1 data 217A and LP2 data 217B as retransmission data 219 to multiplexer 210. Transmission controller 220 controls multiplexer 210 to selectively output transmission data 209 received from transmission data buffer 206, and retransmission data 219 received from retransmission data buffer 216, as data frames 109, to Trellis, IFFT, and DAC unit 110 (FIG. 1). In one embodiment, for each data frame 109, transmission controller 220 controls the percentage or ratio of transmission data 209 to retransmission data 219 contained in the frame, the percentage or ratio of LP1 data 207A to LP2 data 207B contained in the frame, and the percentage or ratio of LP1 data 217A to LP2 data 217B. The generation of frames 109 is described in further detail below with reference to FIGS. 3-5.

In the illustrated embodiment, retransmission data logic 218 receives retransmission requests from receiver 104 via communication link 119, and in response, identifies the requested data in retransmission data buffer 216, and forwards the requested data from retransmission data buffer 216 to multiplexer 210 for retransmission to receiver 104.

Figure 3:
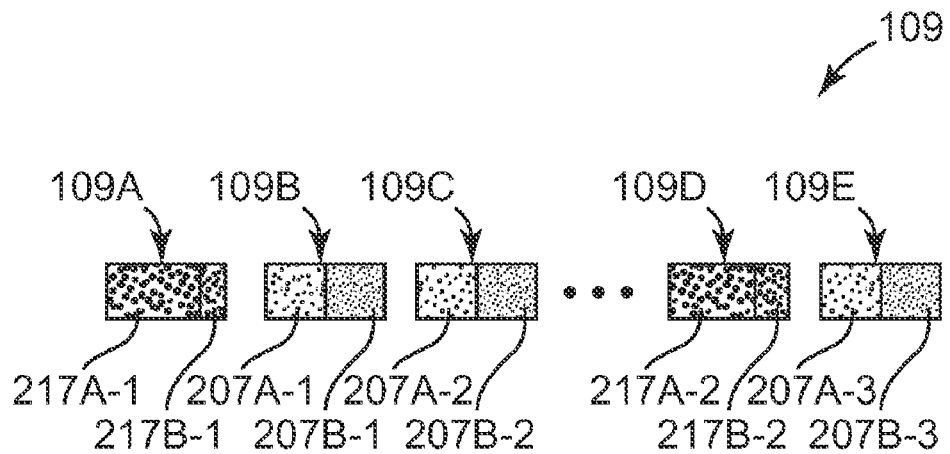
FIG. 3 is a diagram illustrating symbols generated by the transmission unit shown in FIG. 2 according to one embodiment.

FIG. 3 is a diagram illustrating symbols or frames 109 generated by the transmission unit 108 shown in FIG. 2 according to one embodiment. As shown in FIG. 3, frames 109 include five example frames 109A-109E.

Frame 109A includes 100 percent retransmission data from retransmission data buffer 216. The retransmission data in frame 109A includes LP1 data 217A-1, which is a portion of LP1 data 217A that has been requested for retransmission by receiver 104, and LP2 data 217B-1, which is a portion of LP2 data 217B that has been requested for retransmission by receiver 104. Frame 109A includes a higher percentage of LP1 data 217A-1 than LP2 data 217B-1.

Frame 109B includes 100 percent transmission data from transmission data buffer 206. The transmission data in frame 109B includes LP1 data 207A-1, which is a portion of LP1 data 207A from buffer 206, and LP2 data 207B-1, which is a portion of LP2 data 207B from buffer 206. Frame 109B includes an equal percentage of LP1 data 207A-1 and LP2 data 207B-1.

Frame 109C includes 100 percent transmission data from transmission data buffer 206. The transmission data in frame 109C includes LP1 data 207A-2, which is a portion of LP1 data 207A from buffer 206, and LP2 data 207B-2, which is a portion of LP2 data 207B from buffer 206. Frame 109C includes an equal percentage of LP1 data 207A-2 and LP2 data 207B-2.

Frame 109D includes 100 percent retransmission data from retransmission data buffer 216. The retransmission data in frame 109D includes LP1 data 217A-2, which is a portion of LP1 data 217A that has been requested for retransmission by receiver 104, and LP2 data 217B-2, which is a portion of LP2 data 217B that has been requested for retransmission by receiver 104. Frame 109D includes a higher percentage of LP1 data 217A-2 than LP2 data 217B-2.

Frame 109E includes 100 percent transmission data from transmission data buffer 206. The transmission data in frame 109E includes LP1 data 207A-3, which is a portion of LP1 data 207A from buffer 206, and LP2 data 207B-3, which is a portion of LP2 data 207B from buffer 206. Frame 109E includes an equal percentage of LP1 data 207A-3 and LP2 data 207B-3.

Figure 4:
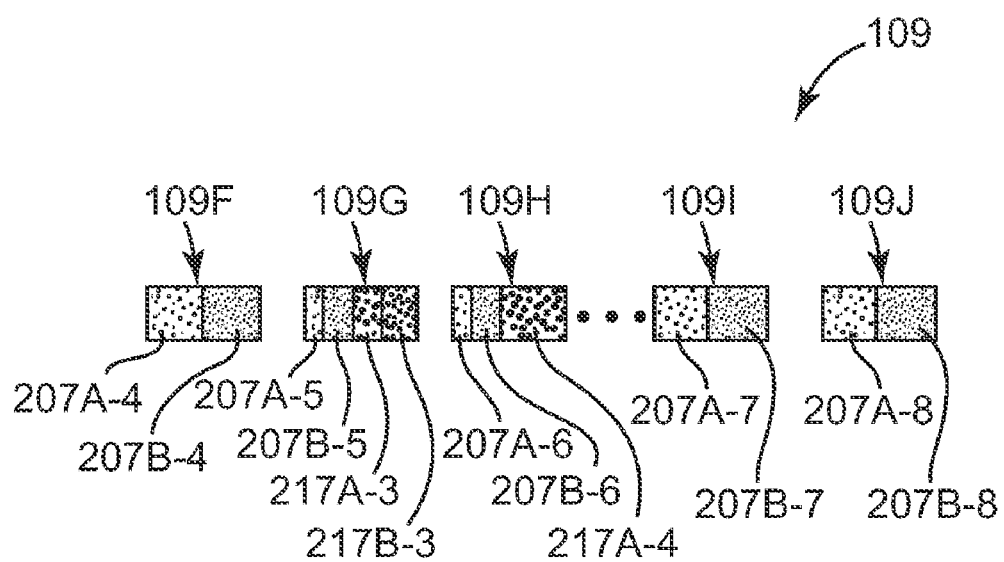
FIG. 4 is a diagram illustrating symbols generated by the transmission unit shown in FIG. 2 according to another embodiment.

FIG. 4 is a diagram illustrating symbols or frames 109 generated by the transmission unit 108 shown in FIG. 2 according to another embodiment. As shown in FIG. 4, frames 109 include five example frames 109F-109J.

Frame 109F includes 100 percent transmission data from transmission data buffer 206. The transmission data in frame 109F includes LP1 data 207A-4, which is a portion of LP1 data 207A from buffer 206, and LP2 data 207B-4, which is a portion of LP2 data 207B from buffer 206. Frame 109F includes an equal percentage of LP1 data 207A-4 and LP2 data 207B-4.

Frame 109G includes approximately 50 percent transmission data from transmission data buffer 206, and 50 percent retransmission data from retransmission data buffer 216. The transmission data in frame 109G includes LP1 data 207A-5, which is a portion of LP1 data 207A from buffer 206, and LP2 data 207B-5, which is a portion of LP2 data 207B from buffer 206. The retransmission data in frame 109G includes LP1 data 217A-3, which is a portion of LP1 data 217A that has been requested for retransmission by receiver 104, and LP2 data 217B-3, which is a portion of LP2 data 217B that has been requested for retransmission by receiver 104. Frame 109G includes a higher percentage of LP2 data 207B-5 than LP1 data 207A-5, and an equal percentage of LP1 data 217A-3 and LP2 data 217B-3.

Frame 109H includes approximately 50 percent transmission data from transmission data buffer 206, and 50 percent retransmission data from retransmission data buffer 216. The transmission data in frame 109H includes LP1 data 207A-6, which is a portion of LP1 data 207A from buffer 206, and LP2 data 207B-6, which is a portion of LP2 data 207B from buffer 206. The retransmission data in frame 109H includes LP1 data 217A-4, which is a portion of LP1 data 217A that has been requested for retransmission by receiver 104. Frame 109H includes a higher percentage of LP2 data 207B-6 than LP1 data 207A-6, and 100 percent of the retransmission data in frame 109H is LP1 data 217A-4 (i.e., the frame 109H does not include any LP2 retransmission data).

Frame 109I includes 100 percent transmission data from transmission data buffer 206. The transmission data in frame 109I includes LP1 data 207A-7, which is a portion of LP1 data 207A from buffer 206, and LP2 data 207B-7, which is a portion of LP2 data 207B from buffer 206. Frame 109I includes an equal percentage of LP1 data 207A-7 and LP2 data 207B-7.

Frame 109J includes 100 percent transmission data from transmission data buffer 206. The transmission data in frame 109J includes LP1 data 207A-8, which is a portion of LP1 data 207A from buffer 206, and LP2 data 207B-8, which is a portion of LP2 data 207B from buffer 206. Frame 109J includes an equal percentage of LP1 data 207A-8 and LP2 data 207B-8.

Thus, as shown in FIGS. 3 and 4 and described above, for each data frame 109, transmission controller 220 controls the amount of transmission data 209 and retransmission data 219 contained in the frame, the amount of LP1 data 207A and LP2 data 207B contained in the frame, and the amount of LP1 data 217A and LP2 data 217B. In this manner, transmission controller 220 controls the bandwidth occupied by each latency path for transmission and retransmission.

Figure 5:
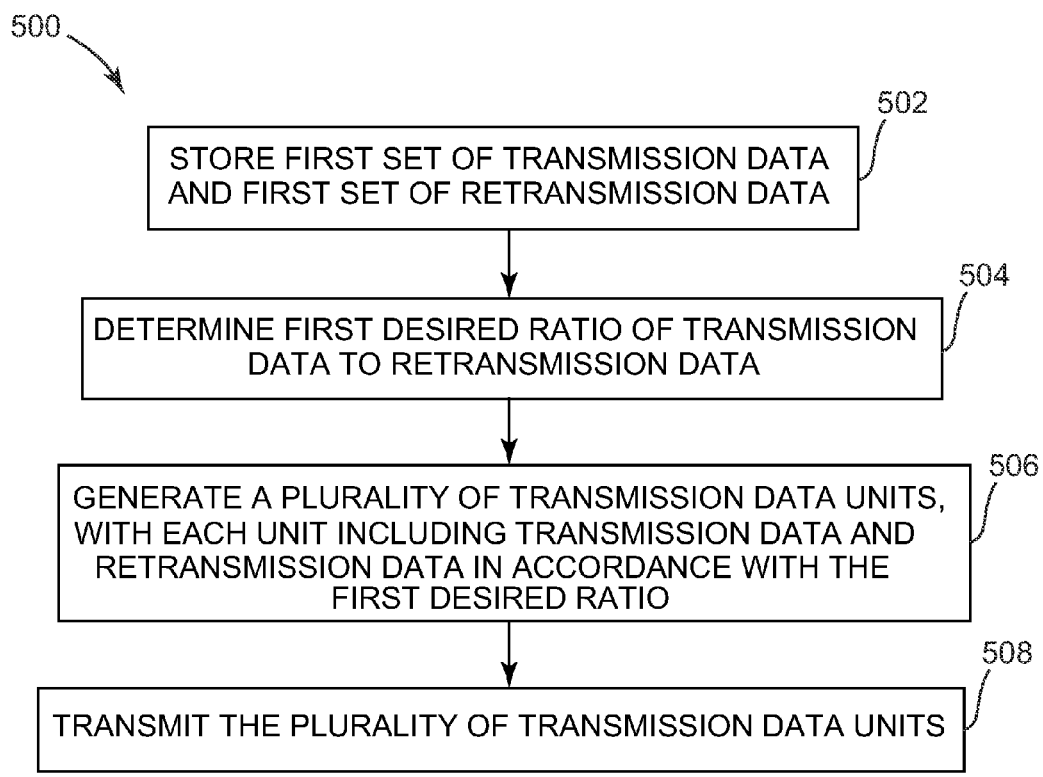
FIG. 5 is a flow diagram illustrating a method of transmitting and retransmitting data according to one embodiment.

FIG. 5 is a flow diagram illustrating a method 500 of transmitting and retransmitting data according to one embodiment. At 502, transmitter 102 (FIG. 1) stores a first set of transmission data and a first set of retransmission data. In one embodiment, the transmission data is stored in transmission data buffer 206 (FIG. 2), and the retransmission data is stored in retransmission data buffer 216 (FIG. 2).

At 504, transmitter 102 determines a first desired ratio of transmission data to retransmission data. In one embodiment, the determination at 504 is made by transmission controller 220 (FIG. 2) of transmitter 102. At 506, transmitter 102 generates a plurality of transmission data units 109 each including a portion of transmission data from the first set of transmission data and a portion of retransmission data from the first set of retransmission data in accordance with the first desired ratio. In one embodiment, the first desired ratio ranges from 100 percent transmission data in each data unit 109 (and 0 percent retransmission data) to 100 percent retransmission data in each data unit (and 0 percent transmission data). At 508, transmitter 102 transmits the plurality of transmission data units 109 to receiver 104. In one embodiment, the transmission data units 109 are discrete multi-tone modulation symbols.

In one embodiment, the first set of transmission data in method 500 comprises transmission data associated with a first latency path (e.g., LP1 data 207A), and the method 500 further includes storing a second set of transmission data associated with a second latency path (e.g., LP2 data 207B), and determining a desired ratio of transmission data from the first set of transmission data to transmission data from the second set of transmission data. Each of the transmission data units 109 includes a portion of transmission data from the first set of transmission data and a portion of transmission data from the second set of transmission data in accordance with the desired ratio. In one embodiment, the desired ratio ranges from 100 percent transmission data from the first latency path in each data unit 109 (and 0 percent transmission data from the second latency path) to 100 percent transmission data from the second latency path in each data unit 109 (and 0 percent transmission data from the first latency path).

In one embodiment, the first set of retransmission data in method 500 comprises retransmission data associated with a first latency path (e.g., LP1 data 217A), and the method 500 further includes storing a second set of retransmission data associated with a second latency path (e.g., LP2 data 217B), and determining a desired ratio of retransmission data from the first set of retransmission data to retransmission data from the second set of retransmission data. Each of the transmission data units 109 includes a portion of retransmission data from the first set of retransmission data and a portion of retransmission data from the second set of retransmission data in accordance with the desired ratio. In one embodiment, the desired ratio ranges from 100 percent retransmission data from the first latency path in each data unit 109 (and 0 percent retransmission data from the second latency path) to 100 percent retransmission data from the second latency path in each data unit 109 (and 0 percent retransmission data from the first latency path).

In one embodiment, the efficiency of retransmission, in terms of delay, protection, and throughput, is increased by system 100 by controlling the share of the retransmission bandwidth between multiple latency paths or between retransmission data and the current data to be transmitted (i.e., transmission data). In one embodiment, system 100 distributes the retransmission bandwidth among latency paths according to the delay, protection, and throughput requirements of each latency path. In one embodiment, the retransmission bandwidth of low-priority latency paths is used to increase protection, throughput, and/or reduce delay for prioritized latency paths.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of transmitting data, comprising:
   storing a first set of transmission data and a first set of retransmission data;
   determining a variable first ratio of transmission data to retransmission data;
   generating a plurality of transmission data units, at least one of the transmission data units including a portion of transmission data from the first set of transmission data and a portion of retransmission data from the first set of retransmission data in accordance with the first ratio; and
   transmitting the plurality of transmission data units,
   wherein the first set of transmission data comprises transmission data associated with a first latency path, and wherein the method further comprises:
   storing a second set of transmission data associated with a second latency path; and
   determining a second ratio of transmission data from the first set of transmission data to transmission data from the second set of transmission data.

2. The method of claim 1, wherein the at least one transmission data unit includes a portion of transmission data from the first set of transmission data and a portion of transmission data from the second set of transmission data in accordance with the second ratio.

3. A method of transmitting data, comprising:
   storing a first set of transmission data and a first set of retransmission data;
   determining a variable first ratio of transmission data to retransmission data;
   generating a plurality of transmission data units, at least one of the transmission data units including a portion of transmission data from the first set of transmission data and a portion of retransmission data from the first set of retransmission data in accordance with the first ratio; and
   transmitting the plurality of transmission data units,
   wherein the first set of retransmission data comprises retransmission data associated with a first latency path, and wherein the method further comprises:
   storing a second set of retransmission data associated with a second latency path; and
   determining a second ratio of retransmission data from the first set of retransmission data to retransmission data from the second set of retransmission data.

4. The method of claim 3, wherein each of the transmission data units includes a portion of retransmission data from the first set of retransmission data and a portion of retransmission data from the second set of retransmission data in accordance with the second ratio.

5. The method of claim 3, and further comprising:
   providing a retransmission data buffer for storing the first and second sets of retransmission data; and
   determining a third ratio of retransmission data associated with the first latency path to retransmission data associated with the second latency path to be stored in the retransmission data buffer.

6. The method of claim 5, and further comprising:
   modifying the third ratio with a controller during normal operation.

7. A data transmitter comprising:
   at least one buffer to store a first set of transmission data and a first set of retransmission data;
   a first controller to determine a variable first ratio of transmission data to retransmission data; and
   a transmission unit to generate a plurality of transmission data units, at least one transmission data unit including a portion of transmission data from the first set of transmission data and a portion of retransmission data from the first set of retransmission data in accordance with the first ratio, and transmit the plurality of transmission data units,
   wherein the first set of transmission data comprises transmission data associated with a first latency path, and wherein the at least one buffer stores a second set of transmission data associated with a second latency path, and wherein the controller determines a second ratio of transmission data from the first set of transmission data to transmission data from the second set of transmission data.

8. The transmitter of claim 7, wherein the at least one transmission data unit includes a portion of transmission data from the first set of transmission data and a portion of transmission data from the second set of transmission data in accordance with the second ratio.

9. A data transmitter comprising:
   at least one buffer to store a first set of transmission data and a first set of retransmission data;
   a first controller to determine a variable first ratio of transmission data to retransmission data; and
   a transmission unit to generate a plurality of transmission data units, at least one transmission data unit including a portion of transmission data from the first set of transmission data and a portion of retransmission data from the first set of retransmission data in accordance with the first ratio, and transmit the plurality of transmission data units,
   wherein the first set of retransmission data comprises retransmission data associated with a first latency path, and wherein the at least one buffer stores a second set of retransmission data associated with a second latency path, and wherein the controller determines a second ratio of retransmission data from the first set of retransmission data to retransmission data from the second set of retransmission data.

10. The transmitter of claim 9, wherein each of the transmission data units includes a portion of retransmission data from the first set of retransmission data and a portion of retransmission data from the second set of retransmission data in accordance with the second ratio.

11. The transmitter of claim 9, wherein the at least one buffer includes a retransmission data buffer for storing the first and second sets of retransmission data, and wherein the transmitter includes a second controller for determining a third ratio of retransmission data associated with the first latency path to retransmission data associated with the second latency path to be stored in the retransmission data buffer.

12. The transmitter of claim 11, wherein the second controller is configured to modify the third ratio during normal operation of the transmitter.

13. A transmitter to transmit and retransmit data associated with a plurality of latency paths via a plurality of transmission data units, the transmitter comprising:
- a controller for controlling a variable amount of retransmission bandwidth to be occupied by each of the plurality of latency paths; and
- at least one buffer to store a first set of transmission data units to be transmitted on a first of the plurality of latency paths and to store a second set of retransmission data units to be transmitted on a second of the plurality of latency paths,
- wherein the at least one buffer includes a retransmission data buffer for storing the first and second sets of retransmission data, and wherein the transmitter includes a second controller for determining a ratio of retransmission data associated with the first latency path to retransmission data associated with the second latency path to be stored in the retransmission data buffer.

14. The transmitter of claim 13, wherein the controller is configured to determine an amount of transmission data and an amount of retransmission data to include in at least one of the transmission data units.

15. The transmitter of claim 13, wherein the controller is configured to determine how much transmission data from each of the latency paths is to be included in each transmission data unit.

16. The transmitter of claim 13, wherein the controller is configured to determine how much retransmission data from each of the latency paths is to be included in each transmission data unit.

17. The transmitter of claim 13, wherein the transmission data units are discrete multi-tone modulation symbols.

18. The transmitter of claim 13, further comprising: a transmission unit to generate a plurality of transmission data units, wherein a first transmission data unit is transmitted while a first latency path has a first retransmission bandwidth level and wherein a second transmission data unit is transmitted while the first latency path has a second, different retransmission bandwidth level.

19. The transmitter of claim 13, wherein the transmitter is configured to transmit and retransmit the data transmission units over a twisted copper pair of wires in accordance with an ADSL communication standard or a VDSL communication standard.

20. The data transmitter of claim 9, wherein the data transmitter is configured to transmit the plurality of data transmission units over a twisted copper pair of wires.

21. The data transmitter of claim 7, wherein the data transmitter is configured to transmit the plurality of data transmission units over a twisted copper pair of wires in accordance with an ADSL communication standard or a VDSL communication standard.

22. The method of claim 5, wherein the plurality of transmission data units are transmitted over a twisted copper pair of wires.

23. The method of claim 3, wherein the plurality of transmission data units are transmitted over a twisted copper pair of wires in accordance with an ADSL communication standard or a VDSL communication standard.

24. The method of claim 1, wherein the plurality of transmission data units are transmitted over a twisted copper pair of wires.

\* \* \* \* \*